Figure 1:
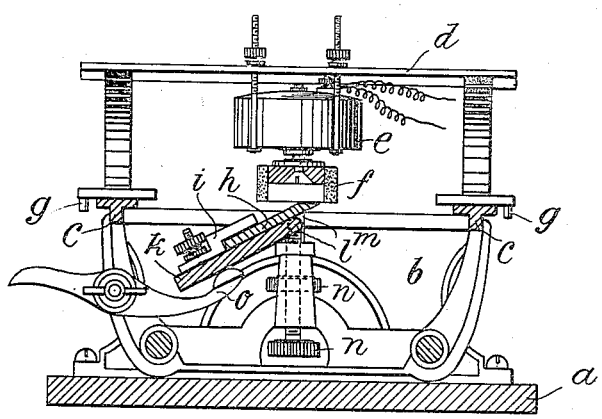

F. FRANKE.
MACHINE FOR GRINDING STRAIGHT MACHINE KNIVES.
APPLICATION FILED AUG. 11, 1908.

946,635.

Patented Jan. 18, 1910.

2 SHEETS—SHEET 1.

F. FRANKE.
MACHINE FOR GRINDING STRAIGHT MACHINE KNIVES.
APPLICATION FILED AUG. 11, 1908.

946,635.

Patented Jan. 18, 1910.
2 SHEETS—SHEET 2.

UNITED STATES PATENT OFFICE.

FRANZ FRANKE, OF RHEINSBERG, GERMANY.

MACHINE FOR GRINDING STRAIGHT MACHINE-KNIVES.

946,635.  Specification of Letters Patent.  Patented Jan. 18, 1910.

Application filed August 11, 1908. Serial No. 447,987.

*To all whom it may concern:*

Be it known that I, FRANZ FRANKE, a citizen of the German Empire, and resident of Rheinsberg i. Mark, Germany, have invented certain new and useful Improvements in Apparatus for Grinding Straight Machine-Knives, of which the following is a specification.

This invention has for its object an apparatus for the accurate grinding of straight machine knives, especially of machines for cutting paper, pasteboard and for the working of wood.

From the apparatus already known, of a similar kind, this invention differs in the main therein that the grinding-apparatus properly speaking can be freely moved as required by hand on horizontal guide-rails arranged parallelly to the edge of the knife independent of the under-frame in which the knife to be ground is fixed in a suitable manner, so that the guide-rails form an abutment for the uniform limitation of the grinding movement at the bottom. By means of this arrangement any unskilled worker can accurately grind the edge of a machine-knife as soon as it is properly fixed. All that is required is to move the grinding-apparatus to and fro on the guide-rails above the edge of the knife and as long as there are still points of attack for the stone.

The grinding-apparatus consists of a frame, which can be shifted on the said guide-rails, with a preferably hollow cylindrical grindstone of the usual kind driven by any desired power by means of an electrical or mechanical transmission.

For fixing the knife to be ground, there is arranged on this new apparatus a plate which is oscillatingly journaled on pivots provided in the prolongation of its upper longitudinal edge in corresponding slots of the under-frame. The plate with the knife fixed on it can be easily adjusted by levers and adjusting-screws in a manner that the edge of the knife to be ground is in the horizontal plane of the guide-rails as required by the rotating grindstone in the shiftable upper frame. In order to give to the knife to be ground the last finishing touch, all that is required is to lower the hind edge of the knife-table a little, whereby the outer edge is at once brought into the right position by the oscillation of the fixing-plate on its pivots. This finishing grinding can either be effected by putting a finer stone into the movable grinding-apparatus worked likewise by motor-power, or a flat finishing-stone can be rigidly fixed in a carriage freely moving to and fro on the guide-rails, and the work can be done by hand by moving the said carriage to and fro.

On the accompanying drawings is illustrated a grinding-apparatus for straight machine-knives according to the principle of this invention in two sample forms of construction.

Figure 2:
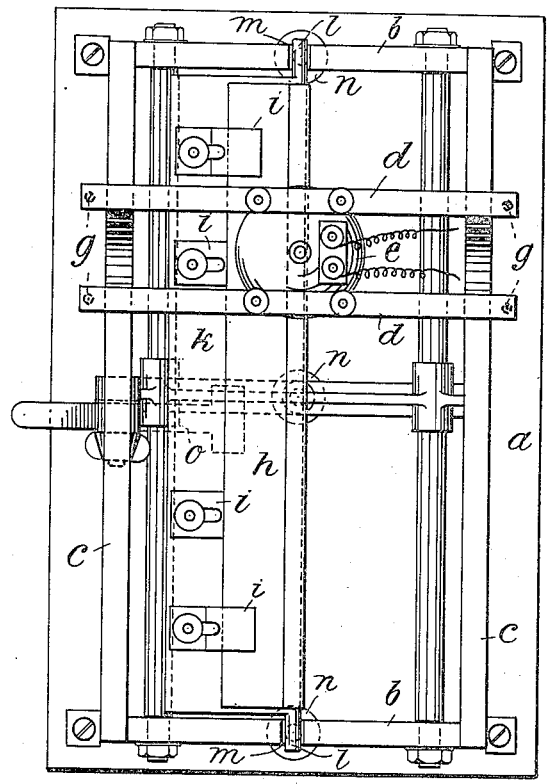

Figure 1 shows the apparatus with a gear for being directly driven by a motor, in a vertical section through the middle. Fig. 2 shows the same apparatus in a top-view, and Fig. 3 in a front-view, with the carriage-like grinding-frame carrying a rigidly fixed grindstone for the finishing-grinding by hand, and Fig. 4 shows an apparatus worked with the foot.

Similar letters refer to similar parts throughout the several views.

Figure 3:
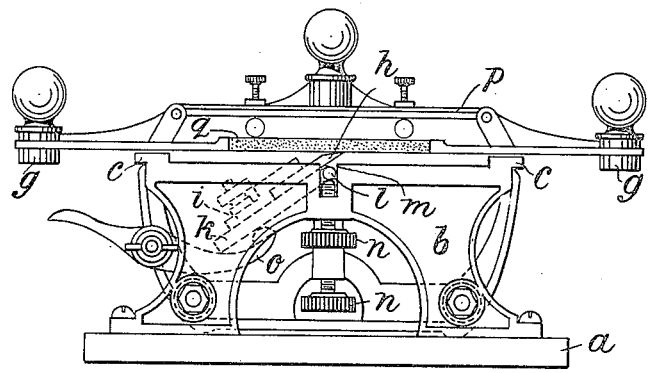
Figure 4:
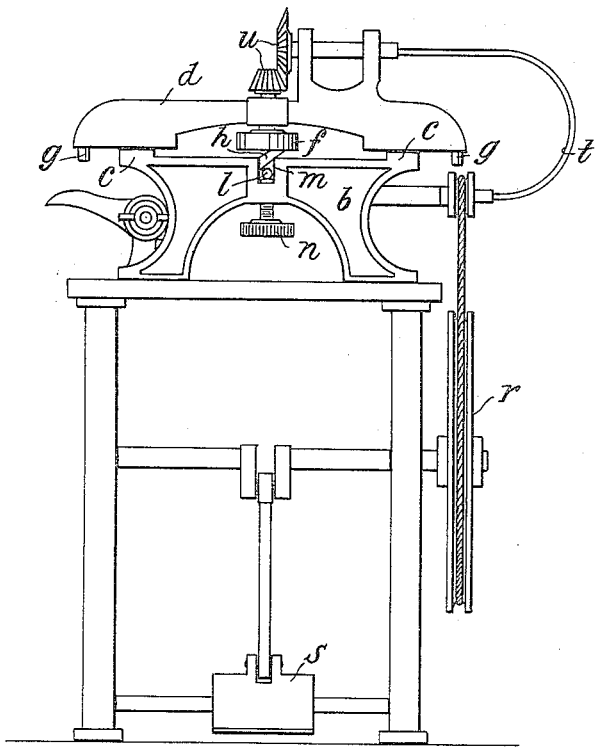

Between the two frame-blocks $b$ of Figs. 1, 2 and 3 fixed on any suitable bottom plate $a$ and united by longitudinal bolts, are arranged the two horizontal guide-rails $c$ serving as abutments for the grinding-apparatus properly speaking. On these guide-rails $c$ slides the grinding-frame $d$ with the electromotor $e$. This frame consists of two head parts likewise connected by rails. The electromotor $e$ is fastened on the upper connecting-rails of the head-parts of the frame $d$ by screws in a manner that it can be raised and lowered, and the grindstone $f$ is directly arranged on the shaft of the motor lengthened at the bottom. The frame $d$ is freely suspended above the guide-rails $c$, and is only secured against a lateral gliding off by pins $g$, which allow it sufficient free play.

The knife $h$ to be ground is fastened on a plate $k$ adjustable with regard to its angle of inclination by means of clamping-jaws $i$, or in any similar manner. This plate $k$ oscillates in slots $m$ of the frame-jacks $b$ on pivots $l$ provided in the direction of its front longitudinal edge, which pivots can be raised and lowered in the said jacks by screw-spindles $n$. With its hind side the plate $k$ rests on a turnable lever $o$, which can be fixed by a winged nut. In consequence of this mode of journaling the plate $k$, with the knife $h$, can be so adjusted that the edge of the knife to be ground is exactly horizontal, and that the plane of the guide-rails $c$ only projects so far at the top as material is to be ground off the edge, which can be easily controlled by placing a ruler on it. The motor $e$ is to be arranged in the frame $d$ in a manner that the under grinding-surface of the stone $f$ lies with the under supporting-surface of the grinding-frame in the same plane. After starting the motor $e$ it is only necessary to move the frame $d$ to and fro on the guide-rails $c$ above the knife so long as the rotating grindstone $f$ finds still an attacking-point on the knife.

In order to sharpen in the usual manner the front edge of the knife thus ground, all that is required is to lower the hind edge of the fixing-plate $k$ a little by means of the lever $o$. The edge of the knife is then sufficiently raised by the plate $k$ turning on its pivot $l$ in order to be finished after a stone of a finer grain has been put in. In order to save time there may also be used for the finishing the carriage-frame $p$ illustrated in Fig. 3 with a finer stone $q$ rigidly fixed in the same. With this frame the finishing of the edge of the knife can likewise be easily effected by moving the same laterally and longitudinally on the guide-rails $c$.

Instead of driving the rotating stone directly by an electromotor, it can also be driven by any other power by means of any suitable mechanical transmission. There may for instance for this purpose be used flexible shafts, elastic cord transmissions and other devices allowing a free shifting of the grinding-frame on the guide-rails.

A further simple form of construction of the apparatus worked by a treadle is illustrated in Fig. 4. This apparatus is arranged on an under-frame after the manner of lathes, and is provided with a fly-wheel $r$ and a treadle $s$. The knife $h$ to be ground is likewise fixed by a suitable means in a manner that the edge to be ground lies in the plane of the horizontal guide-rails $c$. The rotating grindstone $f$ is driven by the fly-wheel $r$ through a cord-transmission by means of a flexible shaft $t$, and with or without the aid of a conical gear $u$.

What I claim as my invention and desire to secure by United States Letters Patent is:—

An apparatus for grinding straight machine knives, comprising a frame provided with guide rails, a pivoted adjustable plate provided with clamping jaws, to which the knife to be ground is clamped, a frame longitudinally and laterally movable on said guide rails provided with parallel plates, carrying a horizontal grinding wheel, means to adjust the grinding-wheel toward and from the knife being ground, and means to adjust the angle of the knife carrying plate, substantially as described.

In testimony whereof I have signed my name to this specification in the presence of two subscribing witnesses.

FRANZ FRANKE.

Witnesses:
HENRY HASPER,
ARTHUR SCHROEDER.